(12) United States Patent
Surjaatmadja et al.

(10) Patent No.: US 11,629,081 B2
(45) Date of Patent: Apr. 18, 2023

(54) WATER TREATMENT FOR REMOVING OXIDATION AGENTS

(71) Applicant: HALLIBURTON ENERGY SERVICES, INC., Houston, TX (US)

(72) Inventors: Jim Basuki Surjaatmadja, Duncan, OK (US); Tim Holiman Hunter, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 326 days.

(21) Appl. No.: 16/427,433

(22) Filed: May 31, 2019

(65) Prior Publication Data
US 2020/0377395 A1   Dec. 3, 2020

(51) Int. Cl.
| C02F 1/76 | (2006.01) |
| C02F 1/38 | (2023.01) |
| C09K 8/66 | (2006.01) |
| C02F 103/34 | (2006.01) |

(52) U.S. Cl.
CPC ............ *C02F 1/76* (2013.01); *C02F 1/38* (2013.01); *C02F 2103/34* (2013.01); *C02F 2201/002* (2013.01); *C02F 2201/4618* (2013.01); *C02F 2303/185* (2013.01); *C02F 2303/20* (2013.01); *C09K 8/66* (2013.01)

(58) Field of Classification Search
CPC .... C02F 1/38; C02F 1/385; C02F 1/66; C02F 1/705; C02F 1/76; C02F 2103/34; C02F 2201/002; C02F 2201/4618; C02F 2209/06; C02F 2303/185; C02F 2303/20; C09K 8/66; C09K 8/84; E21B 21/068
See application file for complete search history.

(56) References Cited

U.S. PATENT DOCUMENTS

| 6,328,896 | B1* | 12/2001 | Atnoor | C02F 1/42 |
| | | | | 204/158.2 |
| 8,739,876 | B2* | 6/2014 | Saini | C04B 40/0633 |
| | | | | 166/305.1 |
| 9,416,455 | B2* | 8/2016 | Sun | C23F 13/06 |
| 10,329,883 | B2* | 6/2019 | Sarmiento Klapper | |
| | | | | C23F 15/00 |
| 11,034,596 | B2* | 6/2021 | Kaminski | C02F 1/283 |
| 2007/0256985 | A1* | 11/2007 | Zhao | C02F 1/705 |
| | | | | 210/757 |
| 2008/0164219 | A1 | 7/2008 | Flemma et al. | |
| 2009/0127210 | A1 | 5/2009 | Swisher | |
| 2010/0243580 | A1* | 9/2010 | Lobban | C02F 1/722 |
| | | | | 210/760 |

(Continued)

OTHER PUBLICATIONS

Abedi B., et al., Experimental use of polymer flooding in fractured systems using five-spot glass micromodel: The role of fracture geometrical properties, Energy Exploration & Exploitation, vol. 30 No. 5 (2012) pp. 689-706. (Year: 2012).*

*Primary Examiner* — Chester T Barry
(74) *Attorney, Agent, or Firm* — Polsinelli PC

(57) ABSTRACT

A water treatment apparatus, system and method including introducing an aqueous fluid into a chamber, the aqueous fluid having a pH below 7 and having an oxidizing agent. Contacting, within the chamber, the aqueous fluid with a corrodible sacrificial material which oxidizes in the presence of the oxidizing agent also reducing the oxidizing agent. Thereafter, adjusting, subsequent contacting the corroding particulate, the pH of the aqueous fluid to above 7.

16 Claims, 2 Drawing Sheets

(56) References Cited

U.S. PATENT DOCUMENTS

| | | |
|---|---|---|
| 2011/0132815 A1 | 6/2011 | Angelilli et al. |
| 2011/0137465 A1 | 6/2011 | Angelilli et al. |
| 2011/0174743 A1* | 7/2011 | Huang .................. C02F 1/705 |
| | | 210/758 |
| 2011/0311645 A1* | 12/2011 | Diaz ..................... C09K 8/88 |
| | | 507/225 |
| 2012/0103919 A1 | 5/2012 | Haggstrom et al. |
| 2013/0015144 A1 | 1/2013 | Boulware et al. |
| 2013/0023448 A1* | 1/2013 | Glasscott ................ C02F 1/32 |
| | | 507/100 |
| 2013/0075079 A1 | 3/2013 | Artherholt |
| 2013/0206398 A1* | 8/2013 | Tufano ................... C09K 8/62 |
| | | 166/308.1 |
| 2013/0330128 A1* | 12/2013 | Shafer .................... C02F 9/00 |
| | | 405/129.25 |
| 2014/0116948 A1* | 5/2014 | Meyer .................. E21B 43/40 |
| | | 166/308.1 |
| 2014/0131039 A1* | 5/2014 | Reichenbach-Klinke ................ |
| | | C09K 8/584 |
| | | 166/270.1 |
| 2014/0263089 A1 | 9/2014 | Agolli et al. |
| 2015/0083663 A1* | 3/2015 | Komor ................ B01D 61/027 |
| | | 210/639 |
| 2015/0150244 A9* | 6/2015 | Annis .................. A61K 9/0014 |
| | | 424/400 |
| 2015/0291462 A1* | 10/2015 | Strominger ............. C23F 11/10 |
| | | 210/758 |
| 2015/0298994 A1* | 10/2015 | Jensen ................ B01D 17/048 |
| | | 210/748.07 |
| 2016/0069160 A1 | 3/2016 | Sherman et al. |
| 2020/0231378 A1* | 7/2020 | Lambert ................ B65D 88/30 |

\* cited by examiner

WATER TREATMENT FOR REMOVING OXIDATION AGENTS

FIELD

The present disclosure relates to treatment of water to remove corrosive compounds, and in particular to the removal of oxidizing agents from an aqueous fluid.

BACKGROUND

During the exploitation of an oilfield for the production of hydrocarbons, operators must necessarily handle and deal with the presence of water. Water may be present at the surface or in subterranean areas below the surface. Water in an oilfield may be generated from a number of sources, including water that is pumped into the wellbore which then flows back to the surface (often referred to as flow-back), water that is naturally occurring in a subterranean formation but is produced to the surface (often referred to as produced waters), and/or water at the surface which is being prepared for use or injection into a wellbore (often referred to as surface water).

The water in the oilfield, whether on the surface or subterranean, may have living organisms such as bacteria. The presence of bacteria may cause a variety of problems downhole as well as with surface equipment. For example, the bacteria may form a sludge or slime downhole thereby causing a reduction in the porosity of a subterranean formation, thereby reducing production of hydrocarbons. Furthermore, the bacteria itself, or compounds formed by the bacteria, such as hydrogen sulfide can cause excessive corrosion in metal tubular goods and surface equipment, a lower oil selling price.

In order to deal with the bacteria, operators often will treat the water, whether downhole or at the surface, with a biocide. The biocide may have the effect of killing or otherwise inhibiting the growth of bacteria.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
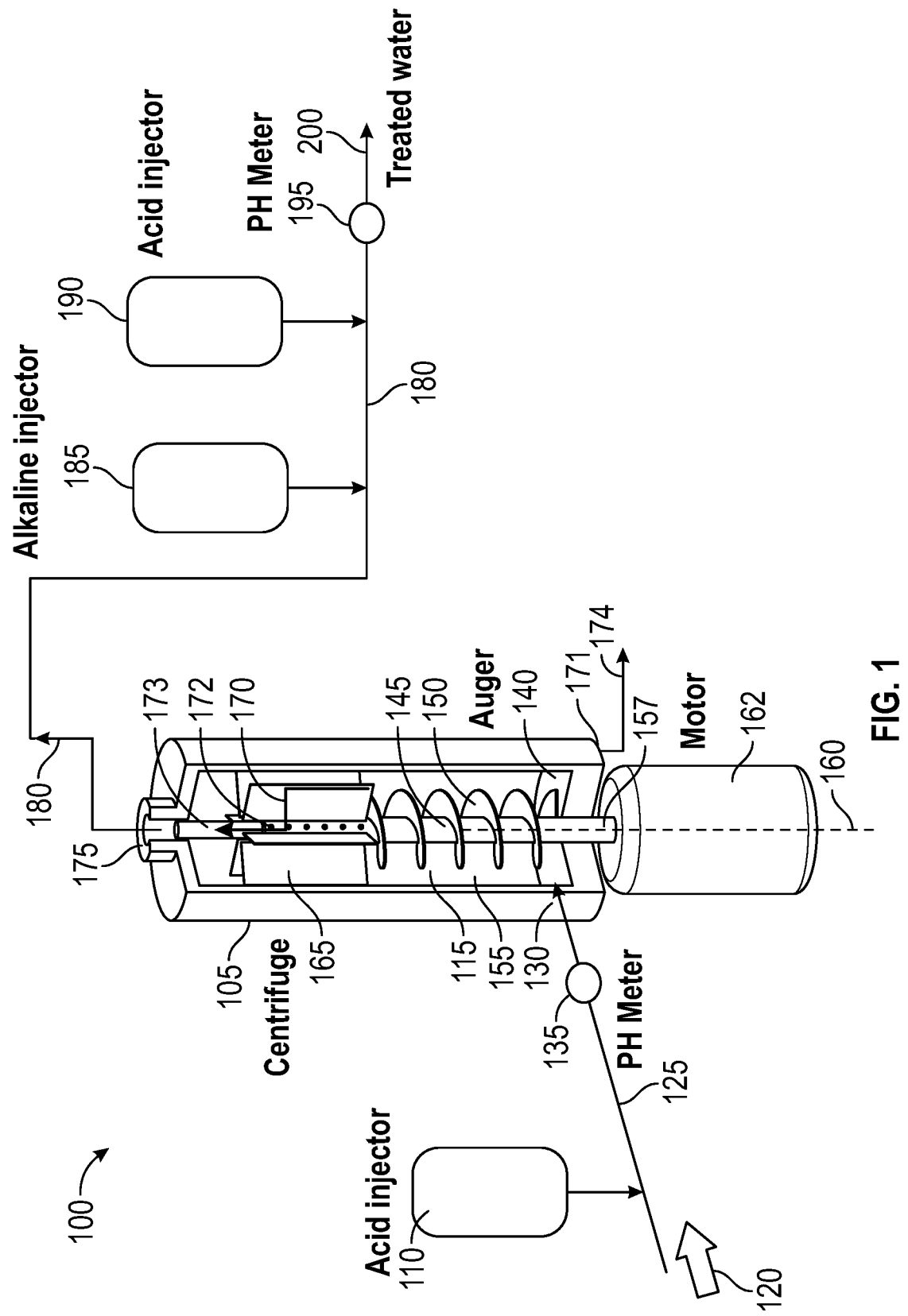
FIG. 1 is a schematic diagram of an example water treatment system for removing oxidation agents according to the present disclosure.

Various embodiments of the disclosure are discussed in details below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

During wellbore operations including stimulation, fracturing and production phases water may be present at the surface of a wellsite or downhole. Such waters may be contaminated with biological microorganisms, such as bacteria. A particular process where this may occur is processes which involved recycling downhole water, such in fracturing processes. During fracturing processes, water is pumped downhole at high pressures to fracture portions of the formation. The water is then recycled back to the surface. Such recycled water may become contaminated with high levels of bacteria. In order to reduce the bacteria, the water is often treated with biocides, which are typically oxidizing agents.

However, even after reduction of the microbial population resulting from the biocide, the biocide remains in the water. The biocides in such recycled water, or any treated water on the surface or downhole, are often oxidants and have the effect of corroding equipment. Excess biocides are unwanted because they will corrode iron surfaces (or other surfaces). Equipment that corrodes includes pipes, wellhead equipment, pumps, tanks, or any material exposed to the biocide containing water that is corrodible by oxidizing agents, for example material made up of iron (Fe) or other oxidizable metal or metal alloy.

The presence of excess oxidizing agents, such as biocides, is particularly at issue in fracturing operations. This is because the average fracturing operation today uses an estimate of 4.5 Millions of gallons per fracture operation, which means that the containment must be much larger. This in turn requires that the water source, such as a containment pond on the surface be much larger than the volume required per fracture. The typical pond may be 20-100 acres size, which means that excess biocides must be used so that most of the water content is treated properly.

The corrosion may create serious issues during operations involving proppants, such as sand in fracturing operations, as sand may continuously remove corroded surfaces. Such corroded surfaces would ordinarily be protective, chemically stable surface for the base metal. But the removal by an abrasive substance such as proppants, which may be sand, essentially expedites the corrosion process.

Disclosed herein is an apparatus, system and method for removing oxidation agents by exposing the oxidation agents in an aqueous fluid to a corrodible sacrificial material ("SMC") which oxidizes in the presence of the oxidizing agent. Furthermore, in this reaction, the oxidizing agent is reduced as part of the reaction and removed from the fluid. As disclosed herein, the SMC may be any material that corrodes in the presence of an oxidizing agent, such as an oxidizable metal or metal alloy. The metal or metal alloy may include for example Fe. The aqueous fluid having the oxidizing agent may be provided into a tank having the SMC.

Further, prior to contact with the sacrificial material the aqueous fluid must have, or may be modified to have, an acidic pH, at which the reaction between the SMC and the oxidizing agent is most effective; such as below 7.0, or 6.5 and below. The SMC may be provided in a tank, into which the aqueous fluid is pumped via an inlet. An acid may be added to the aqueous fluid prior to entry to the tank so as to adjust the pH of the aqueous fluid.

The corrodible sacrificial material may be agitated in the tank, for instance by a rotating blade. The blade may be part of an auger or just an angled plate or blade which may urge the corrodible sacrificial material upwards and outwards in the tank, and may fluidize the SMC to assist contact with the oxidizing agent. Further, a centrifuge may be included which urges the corrodible sacrificial material radially outwards toward the walls of the tank and also urges the aqueous fluid toward the outlet at the top of the tank. The blade of the auger or centrifuge SMC may also remove the oxidized outer surface thereby exposing fresh surface to be oxidized, thereby servicing to continuously renew the SMC. Alternately, random motion of the SMC particles may urge the oxidation to be removed through the impaction between particles. The SMC may have irregular or smooth surfaces and maybe be in any form, such as particulate, flake, spherical, ovoid, chips, beads. The SMC may be reduced or removed by the centrifuge, as the centrifuge assists in the removal of heavy solids. Further, a base may be injected into the outlet line in order to raise the pH. Upon exiting the tank the concentration of oxidizing agent in the aqueous fluid is reduced as compared to the concentration at the inlet of the tank.

The aqueous fluid may be fluid drawn from a wellbore, and may have been treated with an oxidizing agent prior to injection into the wellbore, or after having been drawn from the wellbore. Further, the aqueous fluid may have been used in a fracturing treatment and may be recycled fracturing fluid. The oxidation agent may be a biocide, and may have been used to treat the aqueous fluid to remove microorganisms.

As a result of the process, the oxidizing agent reacts with the SMC and is reduced or removed from the aqueous fluid. The primary intent is to insure that the equipment and oxidizable components of the oil site do not come into contact with the oxidizing agent and are accordingly preserved. As a result of the process as disclosed herein, the oxidizing agent oxidizes the SMC rather than the equipment of the site. Since the exposure time through the water treatment system is quite limited, the sensitivity of the SMC material to the oxidation agent may be maximized by changing its environment, such as lowering pH, or increasing heat.

FIG. 1 is a flow diagram illustrating a water treatment system 100 according to the present the present disclosure. The water treatment system 100 includes a tank 105 having a chamber 115. An aqueous fluid 120 having oxidizing agent maybe provided via inlet line 125 to the tank 105 through inlet 130. The aqueous fluid 120 may be a fracturing fluid, production fluid, pit fluid, drilling fluid, or any other wellsite fluid containing water. A pH meter 135 can be provided on inlet line 125 so as to measure pH of the incoming aqueous fluid 120. In commonly known acidizers, it is desirable that the aqueous fluid 120 upon entry in to the tank 105 have an acidic pH. Given that the aqueous fluid 120 may be drawn from downhole or elsewhere around a wellsite, an inlet acid injector 110 may be provided along the inlet line 125 to adjust the pH of the aqueous fluid 120 to increase its acidity. The aqueous fluid 120 can have, or be adjusted to have, a pH of 7.0 or less, alternatively a pH of 6.0 or less, alternatively a pH of 5.5 or less. The inlet acid injector 110 may provide any compound which increases acidity and which does unduly interfere with the oxidation of the SMC, and may include for example, mineral acids, strong acids, including HCL, $H_2SO_4$, $HNO_3$, HBr, HI, $HClO_3$, and $HClO_4$. or organic acids such as acetic acids and formic acids. In addition to acids, the tank 105 or aqueous fluid 120 may be heated to increase the rate of reaction between the oxidation agent and SMC.

The SMC may be provided on the floor 140 of the tank 105. The inlet 130 may also be provided near or through the floor 140 of the tank 105. This way, the incoming aqueous fluid 120 may immediately contact the SMC. A blade may be provided in the tank which may rotate or move in such a way to agitate the SMC, and may be an impeller or auger or any angled plate. For instance, in the illustrated embodiment of FIG. 1, an auger 145 is provided with a blade 150 which is in the shape of a spiral or helix. Upon rotation the auger 145 lifts the SMC upwards to the top of the tank 105 toward the outlet 175 while also expelling them radially outward from the central axis 160 toward the inner surface 155 of tank 105. The blade 150 may have irregular or rough surfaces to rub against the SMC to be remove the oxidized portions of the surface. This permits the SMC to be renewed by continuously revealing an exposed oxidizable surface for contact with the oxidizing agent. The auger or angled plate may essentially fluidize the SMC so as to mix and promote contact of the SMC with the oxidizing agent in the aqueous fluid 120. The inner surface 155 of the tank 105 may have an oxidation resistant coating, such a as a polymer coating or an oxidation resistant metal, such as Pt, Au, Pd, Ni, Cr, brass, bronze, or stainless steels.

A centrifuge 165 is provided in an upper portion of the tank 105 above the auger 145. As mentioned above, such separation Rotation of the centrifuge 165 can further expel SMC against the inner surface 155 of the tank 105. The centrifuge 165 may assist in the removal of heavy solids from the aqueous fluid 120. Such heavy solids include the SMC which may reduce in size, along with other abrasives such as proppants or residue from the wellbore and formation. The centrifuge may be any heavy solid removal separations device. Alternatives include cyclonic separators, orbital separators, sifts, angular cylinder separators, well screens and the like. For instance, a solids removal exit line 174 from port 171 may be provided for controlled exit of solids dropped from the centrifuge. A motor 162 may power rotation of a central rod 157 in a clockwise or counterclockwise direction. The motor 162 may be electric or gas powered. A plurality of apertures 172 to a central bore 173 provide a path 170 for the aqueous fluid 120 to exit the tank 105 through the outlet 175. An outlet line 180 carries the aqueous fluid 120 from the tank 105. Coupled with the line is an outlet pH meter 195 to measure the pH of the outgoing aqueous fluid 120. An outlet base injector 185 and an outlet acid injector 190 are coupled with the outlet line 180 to inject an acid or a base to adjust the aqueous fluid 120 to the desirable pH. The acids may include the same as those used in inlet acid injector 110. Bases for use in outlet base injector 185 may include metal hydroxides, NaOH, $NH_4OH$, $Mg(OH)_2$, $Ca(OH)_2$ The aqueous fluid 120 exiting the tank 105 may therefore be modified to have a neutral pH, or just above neutral, and may be modified to have a pH of 7.0, 7.5 or 8.

In operation, the aqueous fluid 120 having an oxidizing agent enters the tank 105 and contacts the SMC contained within the tank. As the aqueous fluid 120 contacts the SMC, the SMC corrodes due to an oxidation reaction which occurs in the presence of the oxidizing agent of the aqueous fluid 120. Due to the agitation of the auger 145 and the irregular surface of the blade 150, the SMC will continuously expose new corrodible surfaces to the oxidizing agent. Furthermore, in order to assure the oxidation reaction occurs, the aqueous fluid 120 can be acidic, or made to be acidic by the inlet acid injector 110. Upon exit from the tank 105, the pH of aqueous fluid 120 can be readjusted. As a result of the process, the SMC is oxidized rather than the wellsite equipment, and the oxidation level of the aqueous fluid 120 is reduced.

The tank 105 may be sized so that the resident time and flow rate of the aqueous fluid 120 is sufficiently long to permit sufficient exposure time for the oxidation reaction to occur between the oxidation agent to the SMC and sufficiently reduce the amount of oxidation agent. As a result of the reaction, the concentration of the oxidation agent in the aqueous fluid 120 is reduced.

The SMC may be any material that oxidizes or otherwise corrodes in the presence of the oxidation agent. The SMC may include metals, alloys and/or composites which oxidize, which are or include Fe, Cu, and/or Zn. The reaction is an oxidation-reduction reaction. Accordingly, as the SMC is oxidized, the oxidization agent is chemically reduced. Therefore, as the SMC is oxidized, and oxidation agent reduced, the oxidation agent is removed from the aqueous fluid and its concentration decreased.

Oxidization agents include compounds which may be used as biocides in at a wellsite. Oxidizing agents and biocides may include species which rely on the action of released free radical species that attack cellular components, and may include for instance chlorine based or bromine based compounds, or other halogen based compounds. Oxidizing agents may include compounds which are, contain, or give rise to chlorine, chlorine anions, chlorine dioxide, chloride, bleach, hypochlorite, hypochlorite salts (salts with alkali metals or alkaline earth metals such as sodium-, lithium-, or calcium-hypochlorite), bromine, N-bromosuccinimide (NBS), hypobromite salts (such as sodium-, lithium-, or calcium-hypobromite), bromine chloride, hydroxyl radicals, chlorine dioxide, peroxide, hydrogen peroxide, sodium hydroxide, peracids, peracetic acid, persulfates, and ozone.

The aqueous fluid may have water as the continuous phase or a discontinuous phase, such as an invert emulsion. The water in the aqueous fluid may be from 5 to 100% of the fluid. The water making up the aqueous fluid may be water, saltwater, seawater, brine, freshwater, and the like.

The concentration of the oxidizing agent may depend on the particular oxidizing agent used, as well as the particular process or use of the aqueous fluid. The oxidation agent content may also depends upon the concentration of any deoxidizing substances which may be present within the treated fluid. For instance, the inlet concentration entering inlet 130 of tank 105 in FIG. 1 maybe from 1 to 500 ppm, alternatively from 1 to 250 ppm, alternatively from 1 to 150 ppm, alternatively from 1 to 100 ppm, alternatively from 1 to 50 ppm, alternatively from 1 to 25 ppm, alternatively from 1-10 ppm, alternatively from 1-5 ppm, with ranges including combinations of each of the aforementioned.

The aqueous fluid after reaction, and exiting the tank 105 in outlet 175 may include an at least 10% decrease in concentration of the oxidizing agent, alternatively at least 25% decrease, alternatively at least about a 50% decrease, alternatively at least about a 75% decrease, alternatively at least about a 85% decrease, alternatively at least about a 90% decrease, alternatively at least about a 95% decrease, alternatively at least about a 98% decrease, alternatively at least about a 99% decrease, alternatively at least about a 100% decrease, alternatively a decrease in the range of from about 10 to about 100%, alternatively from about 25% to about 100%, alternatively from about 40% to about 100%, alternatively from about 50% to about 100%, alternatively from about 75% to about 100%, alternatively from about 85% to about 100%, alternatively from about 90% to about 100%, alternatively from about 95% to about 100%, alternatively from about 98% to about 100%, alternatively from 99% to 100%.

The aqueous fluid may be water drawn from within a wellbore or from the surface of the wellsite. The aqueous fluid may be recycled or flowback water from a wellbore and may have a high amount of biological contamination, such as microorganisms and bacteria. The aqueous fluid may be treated with oxidizing agents as a biocide to eliminate or reduce the concentration of microorganisms.

Figure 2:
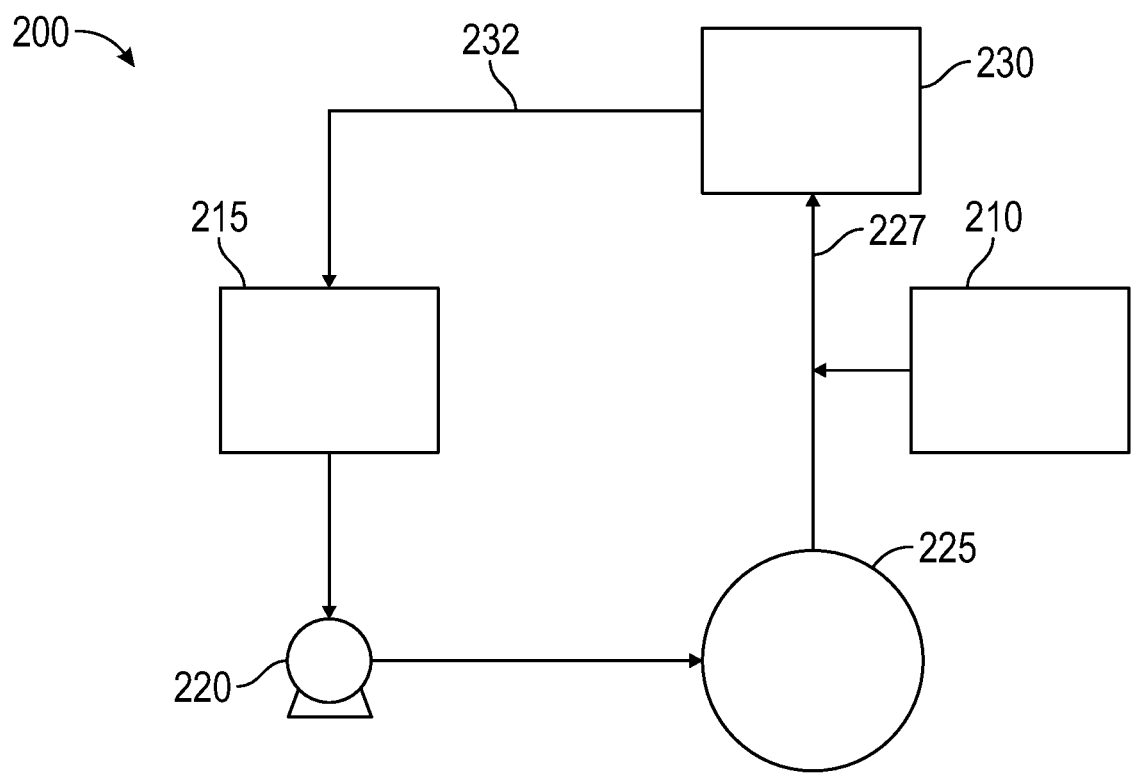
FIG. 2 is a flow diagram illustrating an example of a fracturing system that may be used in association with certain aspects of the present disclosure.

The water may be recycled water from a fracturing process. An exemplary fracturing system 200 is illustrated in FIG. 2. As illustrated a fracturing fluid may be mixed in a container 215. The fracturing fluid may be an aqueous fluid. The fracturing fluid may contain a base fluid, water, a hydrocarbon fluid, a gelling agent, foam, air, nanoparticles, breakers, wet gases and/or other fluids. A proppant may also be added to the fracturing fluid.

An oxidizing agent source 210 may be added to the container 215 having the aqueous fluid, which may act as a biocide. The fracturing fluid may be pumped via pump 220 down a wellbore 225. The fracturing fluid may be pumped with pressure sufficient to create or enhance one or more fractures in a subterranean zone, for example, to stimulate production of fluids from the zone. The proppant particulates in the fracturing fluid may enter fractures where they may remain after the fracturing fluid flows out of the well bore.

The fracturing fluid may then be drawn out of the wellbore 225 by a pump or other method and recycled for use again. This withdrawn fracturing fluid 227 may be treated with an oxidizing agent source 210, which may act as a biocide. The withdrawn fracturing fluid 227 may then be passed through the water treatment system 230 which may be the same water treatment 100 illustrated in FIG. 1. The water treatment system 230 may remove or reduce the oxidizing agents contained in the fracturing fluid as disclosed herein. The treated fracturing fluid 232 may then passed through further equipment and/or reused, by passing back to container 215 and/or pump 220 and into the wellbore 225.

As the oxidizing agents are removed or concentration reduced, the equipment on the oil site which may include materials which are oxidized by oxidizing agents, such as pipes, pumps, containers, are thereby protected from the otherwise corrosive activity of the oxidizing agents.

Statements of the Disclosure Include:

Statement 1: A water treatment method comprising: introducing an aqueous fluid into a chamber, the aqueous fluid comprising an oxidizing agent; contacting, within the chamber, the aqueous fluid with a sacrificial material which reduces the oxidizing agent;

Statement 2: The method according to statement 1, further comprising adjusting a pH of the aqueous fluid to below 7.

Statement 3: The method according to statement 1 or 2, wherein the pH of the aqueous fluid being introduced is 6.5 or less.

Statement 4: The method according to any one of the preceding statements 1-3, further comprising, subsequent reducing the oxidizing agent, adjusting the pH to 7 or greater.

Statement 5: The method according to any one of the preceding statements 1-4, further comprising adding an oxidizing agent to the aqueous fluid prior to introducing to the chamber.

Statement 6: The method according to any one of the preceding statements 1-5, wherein the sacrificial material is a corrodible material Statement 7: The method according to any one of the preceding statements 1-6, wherein the aqueous fluid is drawn from a wellbore.

Statement 8: The method according to any one of the preceding statements 1-7, wherein the aqueous fluid is treated with the oxidizing agent after having been drawn from a wellbore, the oxidizing agent being a biocide.

Statement 9: The method according to any one of the preceding statements 1-8, wherein the aqueous fluid is a fracturing fluid drawn from the wellbore subsequent fracturing operations.

Statement 10: The method according to any one of the preceding statements 1-9, wherein the internal surface of the chamber is oxidation resistant.

Statement 11: The method according to any one of the preceding statements 1-10, wherein the oxidizing agent is a chlorine containing compound.

Statement 12: The method according to any one of the preceding statements 1-11, wherein the sacrificial material is in the form of a particulate.

Statement 13: The method according to any one of the preceding statements 1-12, wherein the sacrificial material comprises a surface having an exposed oxidizable metal or metal alloy.

Statement 14: The method according to any one of the preceding statements 1-13, wherein the aqueous fluid is mechanically agitated.

Statement 15: The method according to any one of the preceding statements 1-14, a blade rotatably admixes the sacrificial material.

Statement 16: The method according to any one of the preceding statements 1-15, wherein the tank comprises a centrifuge.

Statement 17: A water treatment apparatus comprising: a chamber having an inlet for receiving an aqueous fluid and an outlet for the aqueous fluid; a sacrificial particulate at a base of the chamber; an inlet pH meter coupled with a line extending to the inlet and an outlet pH meter coupled with a line extending from the outlet; an acid injector coupled with the line extending to the inlet, and an alkaline injector coupled with the line extending from the outlet;

Statement 18: The water treatment apparatus of statement 17 further comprising a rotatable blade positioned within the chamber.

Statement 19: The water treatment apparatus of statement 17 or 18 wherein the rotatable blade comprises irregular surfaces.

Statement 20: The water treatment according to any one of the preceding statements 17-19, wherein the sacrificial particulate has exposed oxidizable metal or metal alloy surfaces.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A water treatment method comprising:
drawing out an aqueous fluid from a wellbore;
treating the aqueous fluid with an oxidizing agent;
introducing a sacrificial material into a chamber;
introducing the aqueous fluid into the chamber, the aqueous fluid comprising an oxidizing agent;
agitating the sacrificial material in the chamber, wherein a blade rotatably admixes the sacrificial material;
contacting, within the chamber, the aqueous fluid with the sacrificial material which reduces the oxidizing agent;
composing a fracturing fluid using the aqueous fluid.

2. The method according to claim 1, further comprising adjusting a pH of the aqueous fluid to below 7.

3. The method according to claim 2, wherein the pH of the aqueous fluid being introduced is 6.5 or less.

4. The method according to claim 2, further comprising, subsequent reducing the oxidizing agent, adjusting the pH to 7 or greater.

5. The method according to claim 1, further comprising adding the oxidizing agent to the aqueous fluid prior to introducing to the chamber.

6. The method according to claim 1, wherein the sacrificial material is a corrodible material.

7. The method according to claim 1, the oxidizing agent being a biocide.

8. The method according to claim 1, wherein the aqueous fluid is drawn from the wellbore subsequent fracturing operations.

9. The method according to claim 1, wherein the internal surface of the chamber is oxidation resistant.

10. The method according to claim 1, wherein the oxidizing agent is a chlorine containing compound.

11. The method according to claim 1, wherein the sacrificial material is in the form of a particulate.

12. The method according to claim 1, wherein the sacrificial material comprises a surface having an exposed oxidizable metal or metal alloy.

13. The method according to claim 1, wherein the aqueous fluid is mechanically agitated.

14. The method according to claim 1, wherein the chamber comprises a centrifuge.

15. The method according to claim 1, wherein the sacrificial material is agitated by an auger.

16. The method of claim 15, wherein the blade is part of the auger.

* * * * *